(12) United States Patent
Goldman-Shenhar et al.

(10) Patent No.: US 9,881,503 B1
(45) Date of Patent: Jan. 30, 2018

(54) VEHICLE-TO-PEDESTRIAN-COMMUNICATION SYSTEMS AND METHODS FOR USING THE SAME

(71) Applicant: GM GLOBAL TECHNOLOGY OPERATIONS LLC, Detroit, MI (US)

(72) Inventors: Claudia V. Goldman-Shenhar, Mevasseret Zion (IL); Yael Shmueli Friedland, Tel Aviv (IL); Eilon Riess, Zikron-Yaakov (IL); Tal Philosof, Givatayim (IL); Omer Tsimhoni, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/260,058

(22) Filed: Sep. 8, 2016

(51) Int. Cl.
*G08G 1/01* (2006.01)
*G08G 1/16* (2006.01)
*G05D 1/00* (2006.01)
*G08G 1/005* (2006.01)

(52) U.S. Cl.
CPC ........... *G08G 1/166* (2013.01); *G05D 1/0088* (2013.01); *G08G 1/005* (2013.01)

(58) Field of Classification Search
USPC .... 701/23, 26, 300, 301, 302; 340/901, 902, 340/904
See application file for complete search history.

(56) References Cited

U.S. PATENT DOCUMENTS

| | | | |
|---|---|---|---|
| 7,095,336 B2 | 8/2006 | Rodgers et al. | |
| 7,812,740 B2 | 10/2010 | Mergen | |
| 8,253,589 B2 | 8/2012 | Grimm et al. | |
| 8,620,549 B2 | 12/2013 | Nickolaou et al. | |
| 9,120,484 B1 * | 9/2015 | Ferguson | G05D 1/0055 |
| 9,142,127 B1 * | 9/2015 | McDevitt-Pimbley | |
| | | ............................. | G08G 1/091 |
| 2010/0039291 A1 | 2/2010 | Harrison et al. | |

(Continued)

FOREIGN PATENT DOCUMENTS

EP            1818888 A1     8/2007
JP           2010287161 A     12/2010

*Primary Examiner* — Richard Goldman
(74) *Attorney, Agent, or Firm* — Mickki D. Murray; Parks IP Law LLC

(57) ABSTRACT

An autonomous-driving vehicle system, for implementation at an autonomous-driving vehicle. The autonomous-driving vehicle system includes a hardware-based processing unit and a non-transitory computer-readable storage device comprising and input module and an activity module. The input module, when executed by the hardware-based processing unit, obtains input data indicating presence of a pedestrian communication device near the autonomous-driving vehicle. The activity module, when executed by the hardware-based processing unit: (i) determines, based on the input data, in a pedestrian-presence determination, that the pedestrian communication device is or will soon be near the autonomous-driving vehicle, and (ii) determines, based on the pedestrian-presence determination, an autonomous-driving action to be implemented by the autonomous-driving vehicle. In other aspects, the present technology relates to a method or a non-transitory computer readable storage device, for performing any of the operations described.

18 Claims, 5 Drawing Sheets

(56) References Cited

U.S. PATENT DOCUMENTS

| | | | | |
|---|---|---|---|---|
| 2015/0035685 A1* | 2/2015 | Strickland | ............. | B60Q 9/008 |
| | | | | 340/901 |
| 2015/0091740 A1* | 4/2015 | Bai | ............. | G08B 21/06 |
| | | | | 340/901 |
| 2015/0228195 A1* | 8/2015 | Beaurepaire | ......... | G08G 1/0962 |
| | | | | 340/907 |
| 2015/0336502 A1* | 11/2015 | Hillis | ............. | B60Q 1/26 |
| | | | | 701/23 |
| 2017/0060130 A1* | 3/2017 | Kim | ............. | G05D 1/0055 |

\* cited by examiner

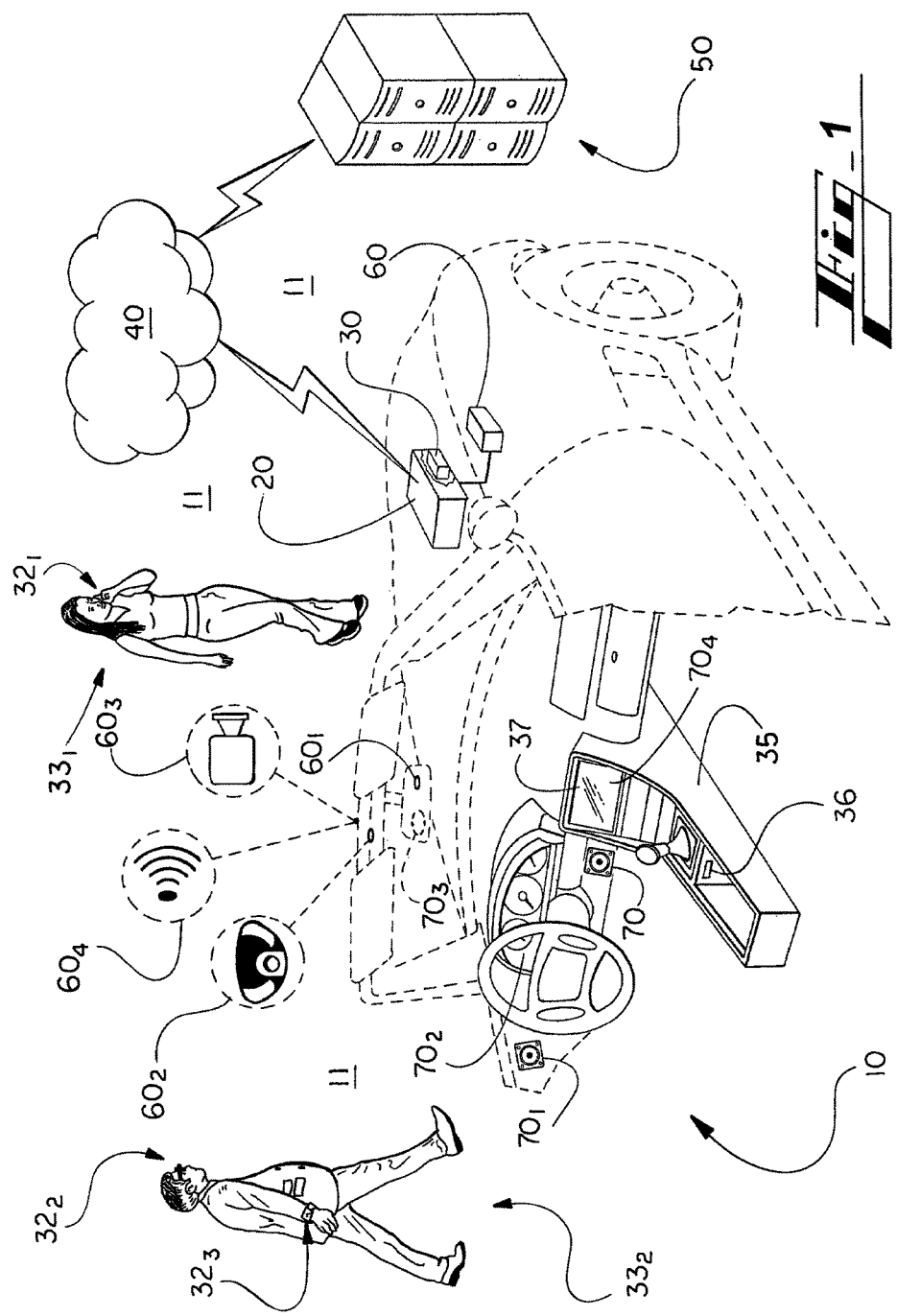

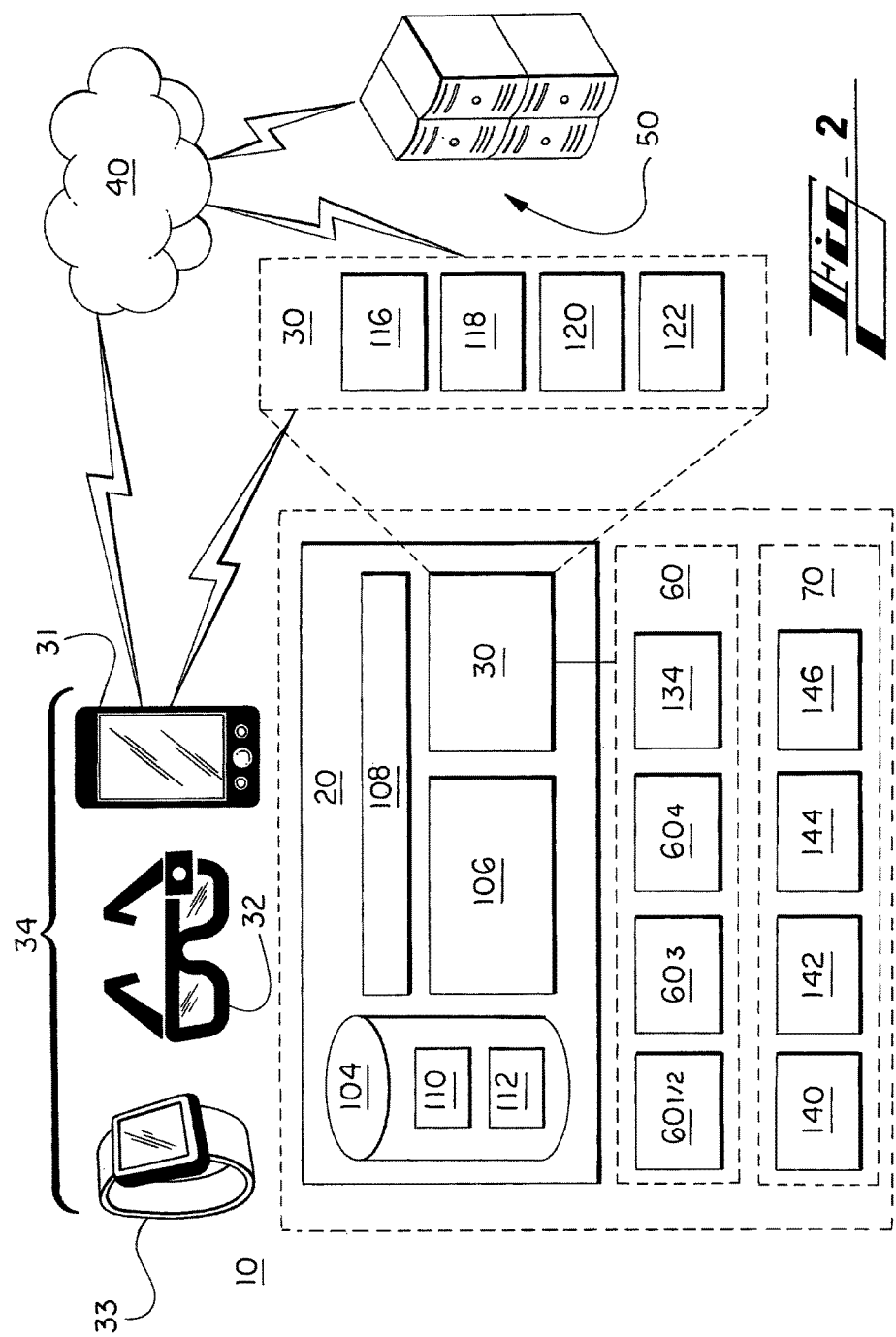

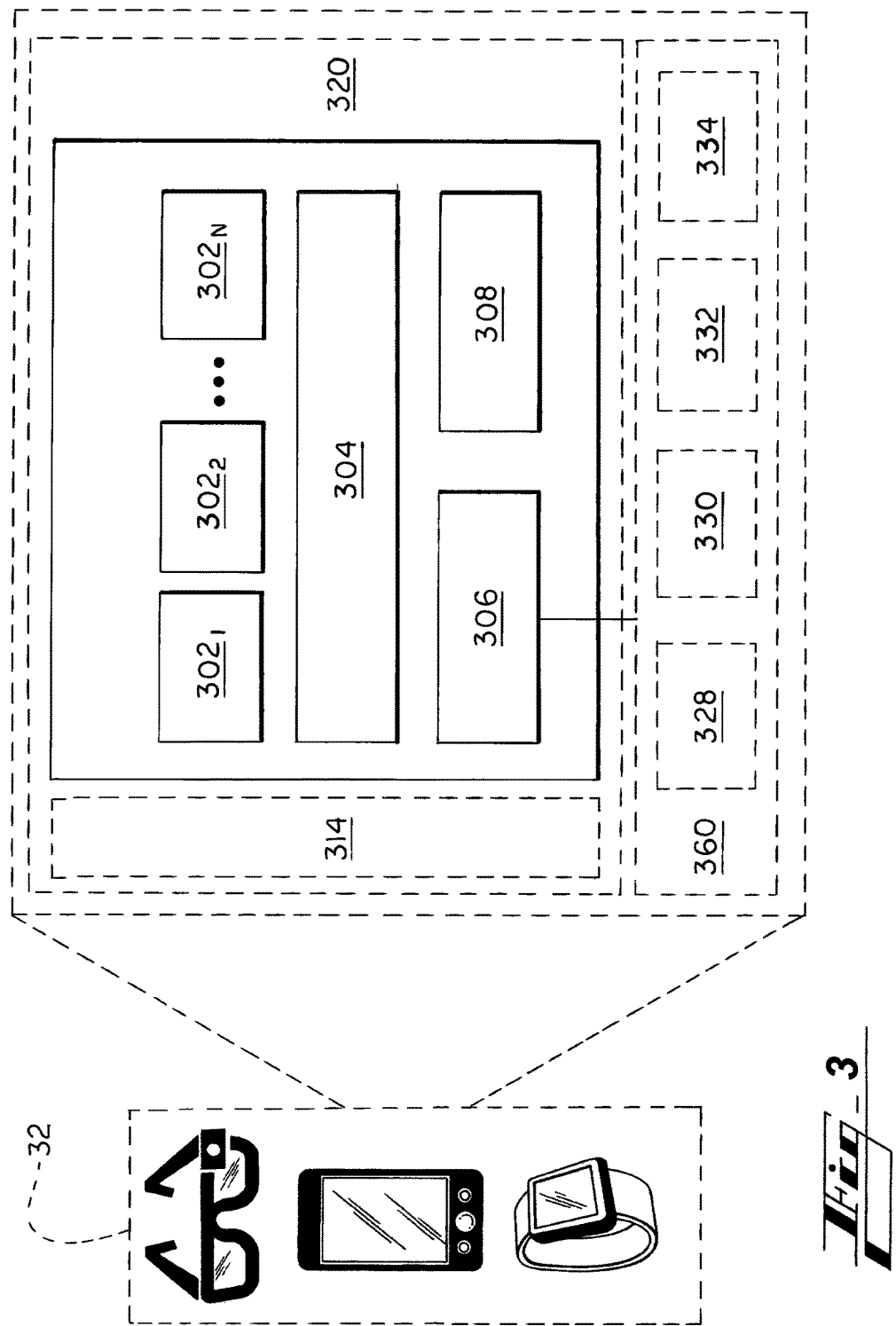

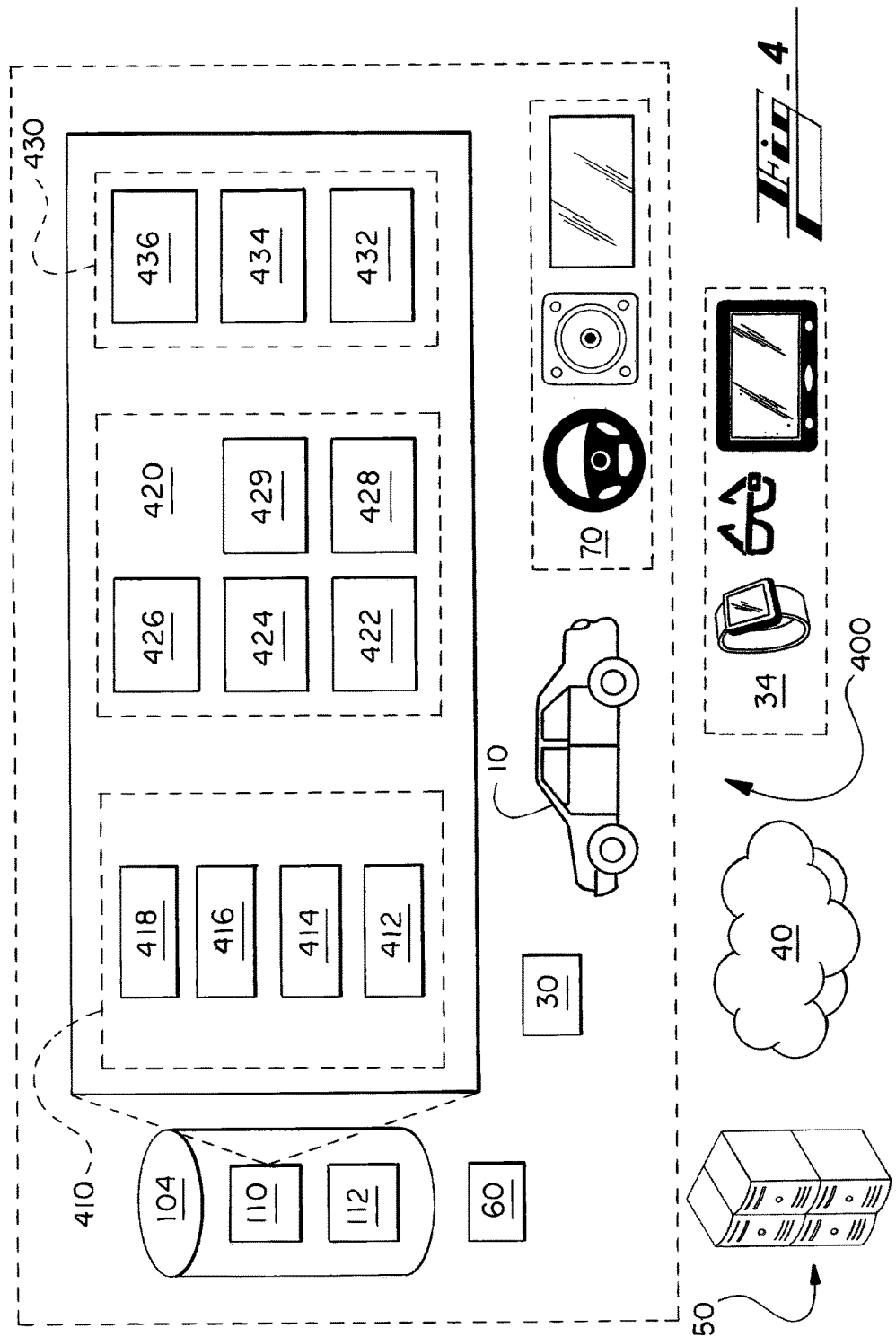

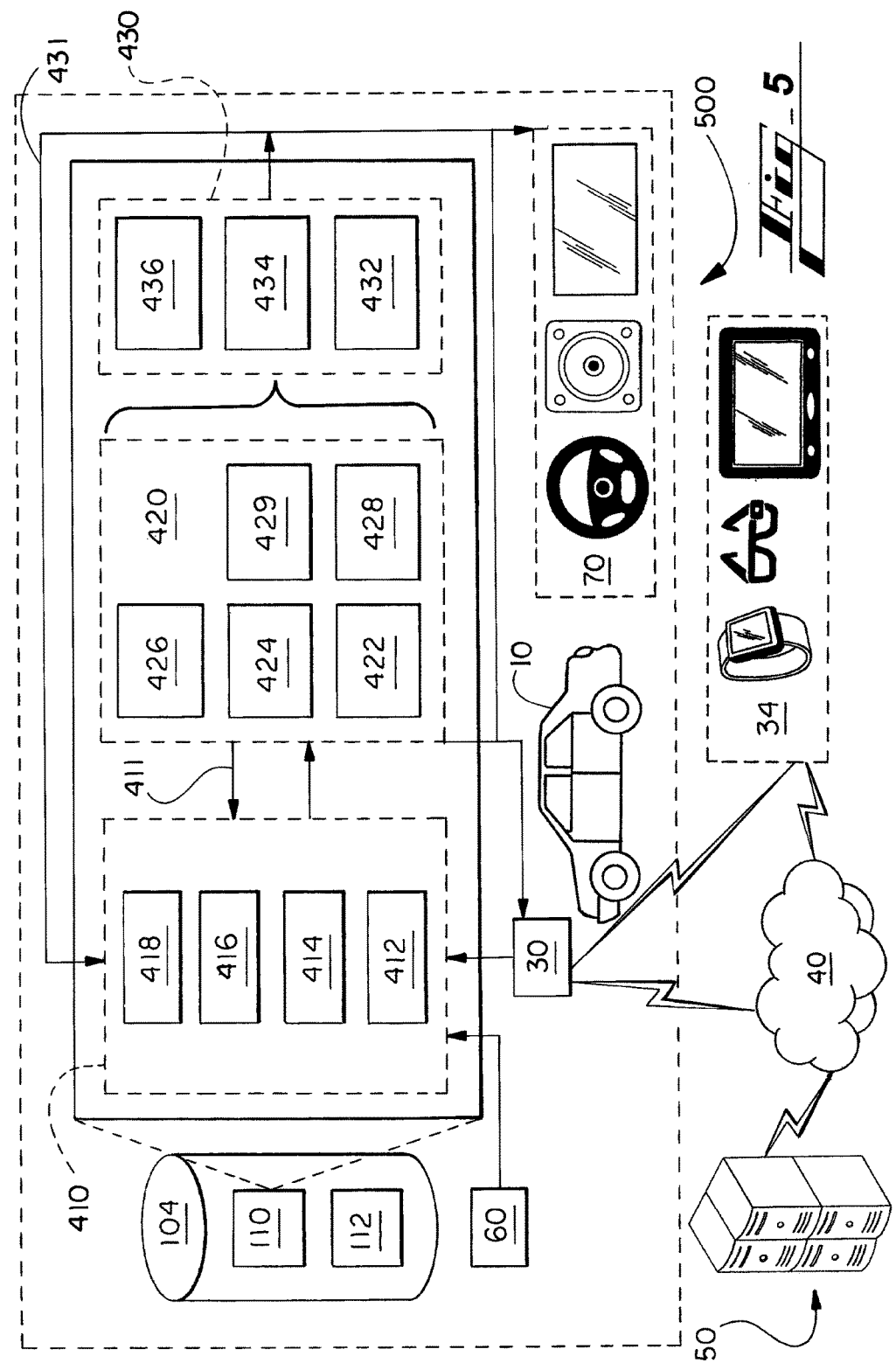

VEHICLE-TO-PEDESTRIAN-COMMUNICATION SYSTEMS AND METHODS FOR USING THE SAME

TECHNICAL FIELD

The present disclosure relates generally to systems and methods for vehicle-to-pedestrian (V2P) communications, and, more particularly, to systems and methods enabling efficient communications between vehicles and pedestrian communication devices, and select activities at the vehicles and pedestrian devices, such as controlling the vehicle or providing vehicle-occupant or pedestrian notifications.

BACKGROUND

This section provides background information related to the present disclosure which is not necessarily prior art.

While vehicles often move near pedestrians, especially in city environments, pedestrians sometimes do not notice vehicles moving nearby. As an example, a pedestrian may not notice that a vehicle is passing quickly on a far side of a truck stopping adjacent the pedestrian, the passing vehicle being blocked substantially from view by the truck.

Vehicle drivers likewise do not see every nearby pedestrian. A driver may not notice, for instance, a pedestrian moving quickly toward the road from behind a visual impediment, such as a wall, building, bus-stop sign, building, or even other pedestrians.

And while autonomous-driving capabilities are developing at a high pace, the vehicles will inevitably, like human drivers, not be able to determine presence or dynamics of every nearby pedestrian.

SUMMARY

Vehicle and pedestrian presence information is very important. Benefits are largely in the area of safety, for vehicle passengers, the pedestrian, and other pedestrians or people nearby, alike. As an example, if a vehicle is driving or being driven relatively fast, on a rural road, main arterial, or other, and the autonomous driving system or driver is not expecting a pedestrian, a notification to the autonomous or human driver that a pedestrian is present is very valuable. Similarly, a pedestrian not expecting a car would benefit from the information that a car is about to pass by.

A path-prediction algorithm, implemented in the vehicle and/or a pedestrian-mobile device, determines when to alert a pedestrian or driver, autonomous or human, about paths potentially crossing or coming near to each other.

In one aspect, the present technology relates to an autonomous-driving vehicle system, for implementation at an autonomous-driving vehicle. The autonomous-driving vehicle system includes a hardware-based processing unit, and a non-transitory computer-readable storage device comprising and input module and an activity module. The input module, when executed by the hardware-based processing unit, obtains input data indicating presence of a pedestrian communication device near the autonomous-driving vehicle. The activity module, when executed by the hardware-based processing unit: (i) determines, based on the input data, in a pedestrian-presence determination, that the pedestrian communication device is or will soon be near the autonomous-driving vehicle, and (ii) determines, based on the pedestrian-presence determination, an autonomous-driving action to be implemented by the autonomous-driving vehicle.

In various embodiments, the input module comprises a pedestrian-device inputs sub-module that, when executed by the hardware-based processing unit, receives, from the pedestrian communication device, a pedestrian-device-to-vehicle instruction communication instructing the autonomous-driving vehicle of a specified manner for the vehicle to operate with respect to the pedestrian holding or wearing the pedestrian communication device.

In some implementations, the pedestrian-device-to-vehicle instruction communication instructs the autonomous-driving vehicle to at least one of blink or illuminate vehicle headlights; actuate a vehicle horn; decelerate; and change lanes.

In various embodiments, the non-transitory computer-readable storage device comprises an outputs module including an autonomous-driving-vehicle-controls sub-module that, when executed by the hardware-based processing unit, initiates performance of the autonomous-driving action by the autonomous-driving vehicle.

In various implementations, the input module includes an autonomous-driving-vehicle-inputs sub-module that, when executed by the hardware-based processing unit, obtains the input data comprising first context data about the autonomous-driving vehicle and the second context data about a nearby vehicle; and the activity module comprises a pedestrian-communications sub-module that, when executed by the hardware-based processing unit, determines, based on the first context data and the second context data, a pedestrian notification for use at the pedestrian communication device to alert a pedestrian using the pedestrian communication device of context involving the autonomous-driving vehicle and the nearby vehicle.

In various embodiments, the pedestrian-communications sub-module determines the pedestrian notification to alert the pedestrian about the nearby vehicle in response to determining that, based on the first and the second context data and pedestrian location, the pedestrian cannot or may not notice the nearby vehicle.

In some case, the pedestrian-communications sub-module determines the pedestrian notification to alert the pedestrian about the nearby vehicle in response to determining that the pedestrian cannot or may not notice the nearby vehicle because the nearby vehicle is or will be positioned behind a visual impediment, including the autonomous-driving vehicle or another visual obstacle, from a perspective of the pedestrian.

In various embodiments, the pedestrian-communications sub-module determines the pedestrian notification to alert the pedestrian about the nearby vehicle in response to determining that, based on the first and the second context data and pedestrian location, the pedestrian cannot or may not notice the autonomous-driving vehicle; and the pedestrian-communications sub-module determines the pedestrian notification to alert the pedestrian about the autonomous-driving vehicle in response to determining that the pedestrian cannot or may not notice the autonomous-driving vehicle because the autonomous-driving vehicle is or will be positioned behind a visual impediment, including the nearby vehicle or another visual obstacle, from a perspective of the pedestrian.

In various embodiments, the input module includes an autonomous-driving-vehicle-inputs sub-module that, when executed by the hardware-based processing unit, obtains the input data comprising first context data about the autonomous-driving vehicle and the second context data about a nearby vehicle; and the activity module comprises an autonomous-driving-vehicle-occupant-communications sub-module that, when executed by the hardware-based processing unit, determines, based on the first context data and the second context data, an autonomous-driving-vehicle-occupant notification to alert an autonomous-driving-vehicle occupant of context involving the pedestrian communication device, the autonomous-driving vehicle, and the nearby vehicle.

In various implementations, the autonomous-driving-vehicle-occupant-communications sub-module determines the autonomous-driving-vehicle-occupant notification to alert the autonomous-driving-vehicle occupant that a nearby pedestrian cannot or may not notice the nearby vehicle and/or presence of the automated-driving vehicle because of a visual impediment, including the nearby vehicle, the autonomous-driving vehicle, or another visual obstacle, from a perspective of the pedestrian.

In various embodiments, the input data comprises vehicle-occupant profile information; and the activity module, when executed by the hardware-based processing unit, determines the autonomous-driving action based on the autonomous-driving-vehicle-occupant profile information.

In various embodiments, obtaining the input data indicating presence of the pedestrian communication device by the input module comprises the input module receiving output from the pedestrian communication device.

In various implementations, the activity module comprises a pedestrian-communications sub-module that, when executed by the hardware-based processing unit, determines, based on the input data, a pedestrian notification for use at the pedestrian communication device to advise a pedestrian using the pedestrian communication device of a manner that the pedestrian should move.

In another aspect, the present technology relates to a vehicle system, for implementation at a vehicle, including a hardware-based processing unit, and a non-transitory computer-readable storage component. The storage component includes an input module that, when executed by the hardware-based processing unit, obtains input data indicative of presence of a pedestrian communication device external to and near the vehicle.

The storage component also includes an activity module that, when executed by the hardware-based processing unit, (a) determines, based on the input data, in a pedestrian-presence determination, that the pedestrian communication device is present near the vehicle, and (b) determines, based on the pedestrian-presence determination, one or more of (i) a pedestrian-device communication to send to the pedestrian communication device determined present, (ii) a vehicle-occupant communication to communicate to an occupant of the vehicle, and (iii) a vehicle driving action to be implemented at the vehicle.

In various embodiments, the non-transitory computer-readable storage component further comprises an output module that, when executed by the hardware-based processing unit, sends the pedestrian-device communication for receipt at the communication device.

In some cases, the pedestrian-device communication includes a notification for use at the pedestrian communication device to alert a pedestrian using the pedestrian communication device about the presence or impending presence of the vehicle near the pedestrian.

In various implementations, the pedestrian-device communication includes an instruction for use at the pedestrian communication device to advise a pedestrian using the pedestrian communication device of a manner that the pedestrian should move.

In various embodiments, the input module obtaining the input data indicative of presence of the pedestrian communication device comprises receiving output from the pedestrian communication device.

In some implementations, the vehicle-occupant communication is configured to advise an occupant of the vehicle about presence or impending presence of the pedestrian communication device near the vehicle.

In various embodiments, the vehicle driving action includes an autonomous driving maneuver to be made at the vehicle.

In various embodiments, the input data includes at least one piece of information selected from a group consisting of vehicle-occupant profile information; pedestrian profile information; vehicle-dynamics information; and pedestrian-device dynamics information.

In other aspects, the present technology relates to methods, and non-transitory computer readable storage devices, for performing any of the operations described.

Other aspects of the present technology will be in part apparent and in part pointed out hereinafter.

DESCRIPTION OF THE DRAWINGS

FIG. 1 illustrates schematically an example vehicle of transportation, with local and remote computing devices, according to embodiments of the present technology.

FIG. 2 illustrates schematically example details of the vehicle computer of FIG. 1 in communication with the local and remote computing devices.

FIG. 3 illustrates schematically example parts of a pedestrian communication device in the forms of a phone or wearable, such as a smartwatch or smart eyeglasses.

FIG. 4 shows exemplary algorithm components, including components of a vehicle configured according to the present technology.

FIG. 5 shows the components of FIG. 4 interacting in performing operations of the vehicle according to the present technology.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, vehicle systems configured to detect presence of local pedestrian communication devices, and take one or more responsive actions.

Responsive actions include communicating with the pedestrian mobile devices, for instance, such as to provide messages to the pedestrian devices about vehicle location and trajectory. The messages can be used at the pedestrian devices to provide notifications to the respective device-holding or device-wearing pedestrians, for instance.

Other example responsive vehicle-system actions include affecting vehicle functions, such as changing vehicle light illumination (e.g., flashing high beams), or changing autonomous driving settings in real time (e.g., decelerate, switch lanes, etc.) based on at least a position of the pedestrian communication devices relative to the vehicle or vehicle trajectory.

Vehicle-system actions in some embodiments include communicating notifications to a driver or passenger(s), collectively occupants, of the vehicle based on the pedestrian communication devices sensed.

In various embodiments, aspects of the technology are implemented at the pedestrian devices, and activities include notifying the pedestrian of circumstances involving the vehicle, such as need to stop walking toward the street because the vehicle is moving on an icy road toward the intersection.

Example pedestrian-device activities also include communicating characteristics about the pedestrian to the vehicle(s) for use in vehicle activities. Pedestrian information may include, for instance, information indicating a handicap about the user, such as partial blindness, being in a wheelchair, or a handicap that affects how they walk.

The vehicle can in turn advise the driver or vehicle occupant of the same if relevant, such as if the person is crossing or apparently about to enter the road. In some implementations, the vehicle has autonomous capabilities, and uses the information about the pedestrian in controlling automated-driving features, such as vehicle speed and direction.

Other example implementations of the technology are described below.

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, busses, trolleys, trains, manufacturing equipment (for example, forklift), construction machines, and agricultural machinery, or of warehouse equipment, the like, and other.

While select examples of the present technology describe autonomous vehicles, the technology is not limited to use in autonomous vehicles (fully or partially autonomous), or to times in which an autonomous-capable vehicle is being driven autonomously.

II. Vehicle Systems—FIG. 1

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communication sub-system 30 for communicating with pedestrian communication devices 32 and external networks 40.

By the external networks 40, such as the Internet, a local-area, cellular, or satellite network, vehicle-to-vehicle, pedestrian-to-vehicle, road-side infrastructure networks, the like or other, the vehicle 10 can reach pedestrian communication devices 32 or remote systems 50, such as remote servers.

Example pedestrian communication devices include a user smartphone $32_1$, shown on a first pedestrian $33_1$, a first example user wearable device $32_2$ in the form of smart eye glasses, worn by a second pedestrian $33_2$, and a second example user wearable device $32_3$ in the form of a smart watch also worn by a second pedestrian $33_2$. Other example wearables include smart apparel, such as a shirt or belt, an accessory such as arm strap, or smart jewelry, such as earrings, necklaces, and lanyards.

Because the example pedestrian communication devices are indicated by reference numeral $32x$ ($32_1$, $32_2$, etc.), pedestrian communication devices are accordingly referred to at times herein generically by the base reference numeral 32.

The vehicle controller system 20, which in contemplated embodiments includes one or more microcontrollers, can communicate with on-board devices (OBDs) via a controller area network (CAN). The CAN message-based protocol is typically designed for multiplex electrical wiring with automobiles, and CAN infrastructure may include a CAN bus. The OBD can also be referred to as vehicle CAN interface (VCI) components or products, and the signals transferred by the CAN may be referred to as CAN signals. Communications between the OBD(s) and the primary controller or microcontroller 20 are in other embodiments executed via similar or other message-based protocol.

The vehicle 10 also has various mounting structures 35. The mounting structures 35 include a central console, a dashboard, and an instrument panel. The mounting structure 35 includes a plug-in port 36—a USB port, for instance—and a visual display 37, such as a touch-sensitive, input/output, human-machine interface (HMI).

The vehicle 10 also has a sensor sub-system 60 including sensors providing information to the controller system 20. The sensor input to the controller 20 is shown schematically at the right, under the vehicle hood, of FIG. 2. Example sensors having base numeral 60 ($60_1$, $60_2$, etc.) are also shown.

Sensor data relates to features such as vehicle operations, vehicle position, and vehicle pose, user characteristics, such as biometrics or physiological measures, and environmental-characteristics pertaining to a vehicle interior or outside of the vehicle 10.

Example sensors include a camera $60_1$ positioned in a rear-view mirror of the vehicle 10, a dome or ceiling camera $60_2$ positioned in a header of the vehicle 10, a world-facing camera $60_3$ (facing away from vehicle 10), and a world-facing range sensor $60_4$. Intra-vehicle-focused sensors $60_1$, $60_2$, such as cameras, and microphones, are configured to sense presence of people, activities or people, or other cabin activity or characteristics. The sensors can also be used for authentication purposes, in a registration or re-registration routine. This subset of sensors are described more below.

World-facing sensors $60_3$, $60_4$ sense characteristics about an environment 11 comprising, for instance, billboards, buildings, other vehicles, traffic signs, traffic lights, pedestrians, etc.

In various embodiments, the vehicle 10 is configured to use one or more pedestrian communication devices 32 (for instance, user phone, user wearable, or user plug-in device) effectively as sensors 60 of the vehicle, such as by using information sensed by a pedestrian device 32 and sent to the vehicle 10. The vehicle system can use data from a pedestrian smartphone, for instance, indicating user-physiological data or phone-movement data sensed by a biometric sensor or accelerometer sensor of the phone.

The vehicle 10 also includes cabin output components 70, such as audio speakers $70_1$, and an instruments panel or display $70_2$. The output components may also include a dash or center-stack display screen $70_3$, a rear-view-mirror screen $70_4$ (for displaying imaging from a vehicle aft/backup camera), and any vehicle visual display device 37.

III. On-Board Computing Architecture—FIG. 2

FIG. 2 illustrates in more detail the hardware-based vehicle controller system 20 of FIG. 1. The controller system 20 can be referred to by other terms, such as computing apparatus, controller, controller apparatus, or such descriptive term, and can be or include one or more microcontrollers, as referenced above.

The controller system 20 is, in various embodiments, part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the processing unit 106 to perform the functions of the controller system 20 described herein. The modules and functions are described further below in connection with FIGS. 4 and 5.

The data storage device 104 in some embodiments also includes ancillary or supporting components 112, such as additional software and/or data supporting performance of the processes of the present disclosure, such as one or more user profiles or a group of default and/or user-set preferences.

As provided, the controller system 20 also includes a communication sub-system 30 for communicating with pedestrian and other external devices and networks 32, 40, 50. The communication sub-system 30 in various embodiments includes any of a wire-based input/output (i/o) 116, at least one long-range wireless transceiver 118, and one or more short- and/or medium-range wireless transceivers 120. Component 122 is shown by way of example to emphasize that the system can be configured to accommodate one or more other types of wired or wireless communications.

The long-range transceiver 118 is in some embodiments configured to facilitate communications between the controller system 20 and a satellite and/or a cellular telecommunications network, which can be considered also indicated schematically by reference numeral 40.

The short- or medium-range transceiver 120 is configured to facilitate short- or medium-range communications, such as communications with pedestrian communication devices (V2P), other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2X or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 20 can, by operation of the processor 106, send and receive information, such as in the form of messages or packetized data, to and from the communication network(s) 40.

Remote devices 50 with which the sub-system 30 communicates are in various embodiments nearby the vehicle 10, remote to the vehicle, or both.

The remote devices 50 can be configured with any suitable structure for performing the operations described herein. Example structure includes any or all structures like those described in connection with the vehicle computing device 20. A remote device 50 includes, for instance, a processing unit, a storage medium comprising modules, a communication bus, and an input/output communication structure. These features are considered shown for the remote device 50 by FIG. 1 and the cross-reference provided by this paragraph.

While pedestrian communication devices 32 are shown within the vehicle 10 in FIGS. 1 and 2, any of them may be external to the vehicle and in communication with the vehicle.

Example remote systems 50 include a remote server (for example, application server), or a remote data, customer-service, and/or control center.

In a contemplated embodiment, at least one pedestrian communication device 32, such as a smartphone, nearby the vehicle 10 is in indirect communication with the sub-system 30 by way of nearby infrastructure (for instance, beacon, or hotspot), or longer-range communications, such as via a cellular network and the Internet or other communication network 40.

An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 comprising sensors providing information to the controller system 20 regarding items such as vehicle operations, vehicle position, vehicle pose, user characteristics, such as biometrics or physiological measures, and/or the environment about the vehicle 10. The arrangement can be configured so that the controller system 20 communicates with, or at least receives signals from sensors of the sensor sub-system 60, via wired or short-range wireless communication links 116, 120.

In various embodiments, the sensor sub-system 60 includes at least one camera and at least one range sensor $60_4$, such as radar or sonar, directed away from the vehicle, such as for supporting autonomous driving. In some embodiments a camera is used to sense range.

Visual-light cameras $60_3$ directed away from the vehicle 10 may include a monocular forward-looking camera, such as those used in lane-departure-warning (LDW) systems. Embodiments may include other camera technologies, such as a stereo camera or a trifocal camera.

Sensors configured to sense external conditions may be arranged or oriented in any of a variety of directions without departing from the scope of the present disclosure. For example, the cameras $60_3$ and the range sensor $60_4$ may be oriented at each position, or a select position, of (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor $60_4$ may include a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include the mentioned cabin sensors ($60_1$, $60_2$, etc.) configured and arranged (for instance, positioned and fitted in the vehicle) to sense activity, people, cabin environmental conditions, or other features relating to the interior of the vehicle. Example cabin sensors ($60_1$, $60_2$, etc.) include microphones, in-vehicle visual-light cameras, seat-weight sensors, user salinity, retina or other user characteristics, biometrics, or physiological measures, and/or the environment about the vehicle 10.

The cabin sensors ($60_1$, $60_2$, etc.), of the vehicle sensors 60, may include one or more temperature-sensitive cameras (for instance, visual-light-based (3D, RGB, RGB-D), infra-red or thermographic) or sensors. In various embodiments, cameras are positioned preferably at a high position in the vehicle 10. Example positions include on a rear-view mirror and in a ceiling compartment.

A higher positioning reduces interference from lateral obstacles, such as front-row seat backs blocking second- or third-row passengers, or blocking more of those passengers. A higher positioned camera (light-based (for instance, RGB, RGB-D, 3D, or thermal or infra-red) or other sensor will likely be able to sense temperature of more of each passenger's body—for example, torso, legs, feet.

Two example locations for the camera(s) are indicated in FIG. 1 by reference numeral $60_1$, $60_2$, etc.—on at rear-view mirror and one at the vehicle header.

Other example sensor sub-systems 60 include dynamic vehicle sensors 132, such as an inertial-momentum unit (IMU), having one or more accelerometers, a wheel sensor, or a sensor associated with a steering system (for example, steering wheel) of the vehicle 10.

The sensors 60 can include any sensor for measuring a vehicle pose or other dynamics, such as position, speed, acceleration, or height—for instance, vehicle height sensor.

The sensors 60 can include any known sensor for measuring an environment of the vehicle, including those mentioned above, and others such as a precipitation sensor for detecting whether and how much it is raining or snowing, a temperature sensor, and any other.

Sensors for sensing user characteristics include any biometric or physiological sensor, such as a camera used for retina or other eye-feature recognition, facial recognition, or fingerprint recognition, a thermal sensor, a microphone used for voice or other user recognition, other types of user-identifying camera-based systems, a weight sensor, breath-quality sensors (for instance, breathalyzer), a user-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), and user-temperature, a sensor measuring salinity level, the like, or other.

User-vehicle interfaces, such as a touch-sensitive display 37, buttons, knobs, the like, or other can also be considered part of the sensor sub-system 60.

FIG. 2 also shows the cabin output components 70 mentioned above. The output components in various embodiments include a mechanism for communicating with vehicle occupants. The components include but are not limited to audio speakers 140, visual displays 142, such as the instruments panel, center-stack display screen, and rear-view-mirror screen, and haptic outputs 144, such as steering wheel or seat vibration actuators. The fourth element 146 in this section 70 is provided to emphasize that the vehicle can include any of a wide variety of other in output components, such as components providing an aroma or light into the cabin.

IV. Example Pedestrian Communication Device—FIG. 3

FIG. 3 illustrates schematically components of a pedestrian communication device 32 of FIGS. 1 and 2.

The pedestrian communication device 32 may be, but is not limited to being, a smart phone $32_1$ or a wearable, such as smart-glasses $32_2$ or a smartwatch $32_3$, as shown in FIG. 1.

The pedestrian communication device 32 can be referred to by other terms, such as a user communication device, user mobile device, user device, user-pedestrian device or communication device, a personal device, or the like.

The pedestrian communication devices 32 are configured with any suitable structure for performing the operations described for them.

Example structure includes analogous structure to any of those described in connection with the vehicle computing device 20 or vehicle, such as output components—for instance, screens, speakers, a hardware-based computer-readable storage medium, or data storage device, like the device 104 of FIG. 2, and a hardware-based processing unit (like the unit 106 of FIG. 2) connected or connectable to the computer-readable storage device by way of a communication link (like link 108), such as a computer bus or wireless structures.

The data storage device can be in any way like the device 104 described above in connection with FIG. 2. For example, the data storage device of the pedestrian communication device 32 can include one or more storage or code modules storing computer-readable code or instructions executable by the processing unit of the pedestrian communication device to perform the functions of the hardware-based controlling apparatus described herein, or the other functions described herein.

The data storage device of the pedestrian communication device 32 in various embodiments also includes ancillary or supporting components, like those 112 of FIG. 2, such as additional software and/or data supporting performance of the processes of the present disclosure, such as one or more driver profiles or a group of default and/or driver-set preferences. The code modules supporting components are in various embodiments components of, or accessible to, one or more pedestrian communication device programs, such as the applications 302 described next.

With reference to FIG. 3, for instance, the example pedestrian communication device 32 includes a device computing system 320 having, along with any analogous features as those shown in FIG. 1 for the vehicle computing system 20:

applications $302^1$, $302^2$, ... $302^N$;

an operating system and device drivers, indicated collectively for simplicity by reference numeral 304;

an input/output component 306 for communicating with local sensors, peripherals, and apparatus beyond the device computing system 320, and external devices, such as by including one or more short-, medium-, or long-range transceiver configured to communicate by way of any communication protocols—example protocols include Dedicated Short-Range Communications (DSRC), WI-FI®, BLUETOOTH®, infrared, infrared data association (IRDA), near field communications (NFC), the like, or improvements thereof;

a device-locating component 308, such as one or more of a GPS receiver, components using multilateration, trilateration, or triangulation, or any component suitable for determining a form of device location (coordinates, proximity, or other) or for providing or supporting location-based services; and hardware based processing unit 314.

The pedestrian communication device 32 can include respective sensor sub-systems 360. Example sensors are indicated by 328, 330, 332, 334.

In various embodiments, the sensor sub-system 360 includes a user-facing and a world-facing camera, both being indicated schematically by reference numeral 328, and a microphone 330. The devices can include any available sub-systems for processing input from sensors including the cameras and microphone, such as voice or facial recognition, retina scanning technology for identification, voice-to-text processing, the like, or other.

In various embodiments, the sensor includes an inertial-momentum unit (IMU) 332, such as one having one or more accelerometers. Using the IMU, the user-pedestrian communication device 32 can determine its orientation. With location data, the orientation data, and map, navigation, or other database information about the environment that the phone is located in, the user-pedestrian communication device 32 can determine what the device 32 is facing, such as a particular road, building, lake, etc. These features are important to augmented reality applications, for instance, in which the reality captured by a device camera, for example, is augmented with database information (from the device, a vehicle, a remote server or other source) based on the location and orientation of the device.

With the orientation data, the device 32 can also determine how the pedestrian is holding the device, as well as how the user is moving the device, such as to determine gestures or desired device adjustments, such as rotating a view displayed on a device screen.

Other sensors 334 include at least one biometric sensor 328, such as a heart-rate (HR) sensor, a microphone for voice analysis, a salinity sensor, a breath-quality sensors (for instance, breathalyzer), a driver-temperature sensor, an Electrocardiogram (ECG) sensor, Electrodermal Activity (EDA) or Galvanic Skin Response (GSR) sensors, a Blood Volume Pulse (BVP) sensor, an electroencephalogram (EEG) sensor, an Electromyography (EMG), the like, or other sensor(s) for measuring biometric or physiological characteristics of the driver.

The sensor group 360 can include one or more of a wide variety of other sensors 334 for performing the functions described herein, including those which may indicate driver impairment.

Any sensor can include or be in communication with a supporting program, which can be considered illustrated by the sensor icon, or by data structures such as one of the applications $302^N$. The user-pedestrian communication device 32 can include any available sub-systems for processing input from sensors. Regarding the cameras 328 and microphone 330, for instance, the user-pedestrian communication device 32 can process camera and microphone data to perform functions such as voice or facial recognition, retina scanning technology for identification, voice-to-text processing, the like, or other. Similar relationships, between a sensor and a supporting program, component, or structure can exist regarding any of the sensors or programs described herein, including with respect to other systems, such as the vehicle 10, and other devices, such as other pedestrian communication devices 32.

V. Additional Vehicle Components—FIG. 4

FIG. 4 shows an alternative view of the vehicle 10 of FIGS. 1 and 2 emphasizing example memory components, and showing associated devices, such as example pedestrian communication devices 32.

As mentioned, the data storage device 104 includes one or more modules 110 for performing the processes of the present disclosure. The device 104 may include ancillary components 112, such as additional software and/or data supporting performance of the processes of the present disclosure.

The ancillary components 112 can include, for example, additional software and/or data supporting performance of the processes of the present disclosure, such as one or more driver or passenger profiles (collectively, occupant profiles), including default and/or user-set preferences.

Any of the code or instructions described can be part of more than one module or sub-module. And any functions described herein can be performed by execution of instructions in one or more modules, though the functions may be described primarily in connection with one module by way of primary example. Each of the modules and sub-modules can be referred to by any of a variety of names, such as by a term or phrase indicative of its function.

Sub-modules can cause the processing hardware-based unit 106 to perform specific operations or routines of module functions. Each sub-module can also be referred to by any of a variety of names, such as by a term or phrase indicative of its function.

Example modules 110 and constituent sub-modules include:
Input Module 410
  a pedestrian-device inputs sub-module 412;
  a vehicle-inputs sub-module 414;
  an external-apparatus inputs sub-module 416; and
  a profiles sub-module 418.
Activity Module 420
  a pedestrian-communications sub-module 422;
  a vehicle-communications sub-module 424;
  a vehicle-controls sub-module 426;
  an external-communications sub-module 428; and
  a systems-update sub-module 429.
Output Module 430
  an occupant-notification sub-module 432;
  a vehicle control output sub-module 434; and
  external communications sub-module 436.

Other vehicle components shown in FIG. 4 include the vehicle communications sub-system 30 and the vehicle sensor sub-system 60. These sub-systems act at least in part as input sources to the sub-modules 110, and particularly to the input-interface sub-module 412.

Example inputs from the communications sub-system 30 include identification signals from pedestrian communication devices 32, which can be used to identify or register a pedestrian communication device, and in some cases the corresponding pedestrian, at the vehicle 10. Inputs from the pedestrian communication devices can thus include profile information about the pedestrian, and device-specific data, such as device location and other dynamics information—e.g., movement, acceleration, etc.

The communication sub-system 30 receives and provides to the input sub-module 410 data from any of a wide variety of sources, including sources separate from the vehicle 10, such as sensor data from local or pedestrian communication devices 32, such as phones or devices worn by pedestrians, other vehicle systems, local infrastructure (local beacons, cellular towers, etc.), satellite systems, and remote systems 50, providing any of a wide variety of information, such as driver-identifying data, driver- or passenger-history data, driver or passenger selections or preferences, contextual data (weather, road conditions, navigation, etc.), program or system updates—remote systems can include, for instance, applications servers 50 corresponding to application(s) operating at the vehicle 10 and any relevant driver devices, computers of a driver or supervisor (parent, work supervisor), vehicle-operator servers, customer-control center system, such as systems of the OnStar® control center mentioned, or a vehicle-operator system, such as that of a taxi company operating a fleet of which the vehicle 10 belongs, or of an operator of a ride-sharing service.

Example inputs from the vehicle sensor sub-system 60 include and are not limited to:
  vehicle dynamics sensors, providing information regarding vehicle position and movements, such as geo-location, speed, direction vector, velocity, acceleration, etc.'
  vehicle-occupant input devices, such as human-machine interfaces (HMIs), such as a touch-sensitive screen, buttons, knobs, microphones, and the like;
  cabin sensors providing data about characteristics within the vehicle 10, such as vehicle-interior temperature, in-seat weight sensors, and motion-detection sensors; and
  environment sensors providing data about conditions at or near the vehicle, such as from external camera and distance sensors (e.g., LiDAR, radar), weather sensors, etc.

The view also shows example vehicle outputs 70, and driver devices 32 that may be positioned in the vehicle 10. Outputs 70 include and are not limited to:
  audio-output component, such as vehicle speakers;
  visual-output component, such as vehicle screens;
  vehicle-dynamics actuators, such as those affecting autonomous driving (vehicle brake, throttle, steering);
  vehicle-climate actuators, such as those controlling HVAC system temperature, humidity, zone outputs, and fan speed(s); and
  pedestrian communication devices 32 and remote systems 50, to which the vehicle system 10 may provide a wide variety of information, such as driver-identifying data, driver-biometric data, driver-history data, contextual data (weather, road conditions, etc.), instructions or data for use in providing notifications, alerts, or messages to the vehicle driver or occupant(s), or relevant entities such as authorities, first responders, parents, an operator or owner of a subject vehicle 10, or a customer-service center system, such as of the OnStar® control center.

The modules, sub-modules, and their functions are described more below.

VI. Vehicle Algorithms and Processes—FIG. 5

VI.A. Introduction to the Vehicle Processes

FIG. 5 shows an example algorithm, process, or routine represented schematically by a flow 500, according to embodiments of the present technology. The flow is at times referred to as a process or method herein for simplicity.

Though a single process 500 is shown for simplicity, any of the functions or operations can be performed in one or more processes, routines, or sub-routines of one or more algorithms, by one or more devices or systems.

It should be understood that steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

In certain embodiments, some or all operations of the processes and/or substantially equivalent operations are performed by a computer processor, such as the hardware-based processing unit 106 of the vehicle 10 executing computer-executable instructions stored on a non-transitory computer-readable storage device 104 of the vehicle system 20.

VI.B. System Components and Functions

FIG. 5 shows the components of FIG. 4 interacting according to various exemplary algorithms and process flows of the present technology.

Though connections between every sub-module is not shown expressly, sub-modules of the input module interact with each other in various ways to accomplish the functions of the present technology.

As shown in FIGS. 4 and 5, the input module 410 includes the pedestrian-device inputs sub-module 412, the vehicle-inputs sub-module 414, the external-apparatus inputs sub-module 416, and the profiles sub-module 418.

The pedestrian-device inputs sub-module 412, executed by the vehicle processing unit 106, receives data indicating presence of at least one nearby pedestrian communication device 32. The data can be received from the pedestrian communication devices 32, such as from a customized application operating at each pedestrian communication device 32.

This communication exchange can result from the vehicle system 20 regularly sending a signal or communication to be received, and returned, by devices 32 having the application. The pedestrian-device application and the program or application of the vehicle system 20 can then perform a handshake or similar process allowing them to better recognize each other or at least to establish a real-time communication channel.

The data in some embodiments indicates one or more characteristics about each pedestrian communication device 32. Characteristics can include information indicating presence of the pedestrian communication device 32. Other example characteristics including identification information about the pedestrian communication device 32, information about the pedestrian using the pedestrian communication device 32, and dynamics information indicating location, position, impending position, and movement of the pedestrian communication devices 32, for instance.

Regarding presence of the pedestrian communication devices 32, in various embodiments the vehicle system 20 determines that one or more of the pedestrian communication devices 32 is present without assistance of other apparatus, such as roadside infrastructure, or cellular or other communication networks. In other embodiments, the vehicle 10 uses such assistance.

The vehicle 10 is configured in various embodiments to receive communications directly from pedestrian communication devices 32, thereby indicating at least presence of the pedestrian communication devices 32.

Communications can be transmitted using any suitable protocol, including and not limited to BLUETOOTH®, infrared, infrared data association (IRDA), near field communications (NFC), WI-FI®, the like, improvements thereof, or other. Though usually for vehicle-to-vehicle (V2V) communications, the protocol for subject vehicle-to-pedestrian device (V2P/P2V) communications can utilize Dedicated Short-Range Communications (DSRC).

In various embodiments, the vehicle system 20—the pedestrian-device inputs sub-module 412 or the pedestrian-communications sub-module 422, for instance—determines which pedestrian communication devices 32 are nearby by sending a broadcast, communication, or signal configured to determine if there are any pedestrian devices 32 nearby. The communication or signal is in some cases configured to be responded to only by mobile communication devices having an application configured to process and respond to the communication or signal.

In a contemplated embodiment, at least some information about the pedestrian communication device 32, or the pedestrian 33 using the device 32, is received from a database other than databases of the vehicle 10 and the pedestrian communication device 32.

The information can be received from a remove server 50, for instance. In various implementations, the vehicle system 20 receives information identifying the pedestrian communication device 32 or the pedestrian 33, such as by a unique alpha, numeric, or alpha-numeric code. With the code, the vehicle system 20 can pull or otherwise obtain information about the device or pedestrian, such as information about pedestrian handicaps, from a customized, remote server 50 configured for supporting operations at the vehicle 10 and/or pedestrian communication device 32 according to the present technology.

Communications from and to the pedestrian communication devices 32 can be made via an application at the respective pedestrian communication devices 32 configured for purposes including performing the functions described herein. The communications are also made via an application at the vehicle system 20 configured for performing the functions described herein.

Characteristics about each of the pedestrian communication devices 32 in various embodiments include, and are not limited to, any of:

- identification information (e.g., device identification code or other identifying information) for the pedestrian communication device 32;
- location or position of the pedestrian communication device 32;
- movement vector indicating direction of movement of the pedestrian communication device 32;
- speed of the pedestrian communication device 32;
- velocity of the pedestrian communication device 32;
- expected further position or location of the pedestrian communication device 32, such as in the expected pedestrian-device location or position that the pedestrian communication device 32 will be at in half a second, or 1 second, etc., as computed at the device 32;
- type of pedestrian communication device 32; and
- weather or other environmental conditions that the pedestrian holding or wearing the device is dealing with, or may have to deal with, such as a snow bank, a puddle, ice, snow, generally, etc.

In a contemplated embodiment, information indicating presence of one or more pedestrian communication devices 32 is received from an intermediate communication system, such as a server 50, a cellular-network apparatus, or other local communication-network infrastructure.

As an example arrangement, the server 50 includes components to serve needs of at least one of the vehicles 10 and the pedestrian communication devices 32 described herein.

Pedestrian-communication-device location can be provided regularly by the device 32 to the intermediate system, such as to the server 50 every 10 seconds. Vehicle location can be provided in a similar manner from the vehicle 10.

When the server 50 determines that a pedestrian communication device 32 is, based on vehicle and pedestrian device positions, in a predetermined vehicle area, the server 50 can notify either or both of the vehicle 10 and the pedestrian communication device 32 that the other is in its vicinity. In some implementations the server 50 provides location data, advising the vehicle 10 or the pedestrian device 50 of the location of the other.

Characteristics about the pedestrians 33 using the pedestrian communication devices 32, in various embodiments, include any of a wide variety of types of information, any of which can be pedestrian-profile information. Example characteristics, represented in communications transmitted, include information indicating:

- a handicap, such as being partially or fully blind, in a wheel chair, on crutches, unable to walk fast, unable to walk at a normal pace, etc.;
- age, such as whether the pedestrian is a child or elderly; and
- drowsiness, or alert level;
- whether they are using their device 32—e.g., texting, emailing, watching a video, on a phone call, etc.
- movements of a pedestrian, such as data indicating that they are standing up, walking, etc.; and
- preferences of the pedestrian, such as types of communications or notifications they prefer, such as text, screen alerts, audible alerts, haptic alerts, high beam light conformation from approaching vehicles in the dark, etc.

Information, such as pedestrian handicap, age, etc. may be determined in any suitable manner, such as by user input, user profile, physiological sensors, pedestrian-device app output, etc.

Data sent to the vehicle 10 from the pedestrian communication device 32 is in various embodiments generated at, received by, or otherwise obtained by the pedestrian communication device 32.

Pedestrian-device data can be obtained from pedestrian-device sensors, for instance. In a contemplated embodiment, the pedestrian-device data includes information input by the pedestrian, such as physiological information, such as information indicating that the pedestrian's foot or leg hurts or that they for are having trouble walking or moving at a normal rate. Such information may be determined in any suitable manner, such as by user input, user profile, physiological sensors, or a sensor measuring a pedestrian walking gate and comparing it to a baseline.

The vehicle-inputs sub-module 414, when executed by the hardware based processing unit, generates, receives, or otherwise obtains information indicating characteristics about the vehicle 10 or vehicle environment, for processing at the activity module 420.

Characteristics about the vehicle 10 in various embodiments include, and are not limited to, any of:

- information from vehicle sensors 60, such as any sensor data used in effecting autonomous driving;
- location or position of the vehicle 10;
- movement vector indicating direction of movement of the vehicle 10;
- speed of the vehicle 10;
- velocity of the vehicle 10;
- expected future position or location of the vehicle 10, such as the location or position that the vehicle 10 will have in half a second, one second, etc., as computed at the vehicle 10; and
- weather conditions, whether sensed at the vehicle 10, such as icy road, slick road, potholes, fog or other limited vision status (driver or vehicle vision), or vision-affecting condition, etc.

Characteristics related to the vehicle 10 can also relate to a driver or passenger (collectively, occupants) of the vehicle 10. These personnel-related characteristics, in various embodiments, include and are not limited to:

- preferences of the vehicle user, such as the type(s) of communications or notifications they prefer, such as text, screen alerts, audible alerts, haptic alerts, etc.;
- a handicap of the user, such as limited sight; and
- age, such as whether the driver is elderly.

These personnel-related characteristics can also be referred to as vehicle-passenger profile information, vehicle-user profile information, the like, or other.

If a driver has limited sight, for instance, the vehicle system 20 may determine that the driver is less lightly to see the pedestrian 33, and so alert the pedestrian 33 about the vehicle 10 approaching, and possibly about the driver sight disability, and/or alert the driver 20 to ensure they are aware of the presence and location of the pedestrian 33.

The external-apparatus inputs sub-module 416, when executed by the hardware based processing unit, receives data from apparatus or systems external to the vehicle 10, other than the pedestrian communication devices 32. External apparatus can include the remote server 50, roadside infrastructure (communication-capable traffic lights, roadside beacons, etc.), as a few examples.

The external-apparatus inputs sub-module 416 can obtain various types of useful data. The data may include weather or environmental conditions at, adjacent, or near the vehicle 10. The data may be received at the external-apparatus inputs sub-module 416 from a server 50, such as a server providing weather information, a server providing traffic information 50, or the mentioned customized server 50, configured for the purpose of supporting operations of the present technology.

In contemplated embodiments, the information received at the external-apparatus inputs sub-module 416 includes any of the information described above in connection with the pedestrian-device inputs sub-module 412.

The profiles sub-module 418, when executed by the hardware based processing unit, generates or receives profile information about the vehicle 10 or vehicle occupants—driver(s), passenger(s), etc. The profiles sub-module 418 can include any of a wide variety of information, such as default or user-set preferences, user-identifying data, and driver- or passenger-history data, such as past driver or passenger selections and the related circumstance data. Profile data can relate to vehicle 10 users and/or users of the pedestrian communication devices 32.

Example profile data includes information indicating physical characteristics of the user, such as a handicap, such as being partially or fully blind, a drowsiness level, an age or age group (e.g., whether elderly), a weight, a height, heartrate, etc.

Example preferences include types of communications or notifications the corresponding user prefers, such as text, screen alerts, audible alerts, haptic alerts, blinking lights—internal or external vehicle lights, etc.

Input sources to the profiles sub-module 418 include vehicle sensors 60 and local or remote devices 32, 50, via the vehicle communication sub-system 30. Inputs also include a vehicle database, via the database sub-module 414.

The profiles sub-module 418, in various embodiments, stores data received, generated, pre-collected, pre-generated, or otherwise obtained, regarding the driver(s), passenger(s), or pedestrians. The data can be stored in corresponding profiles—e.g., driver profile, passenger-1 profile, passenger-2 profile, pedestrian-1 profile, pedestrian-2 profile, etc. The profile can be part of, or accessible by, one or more relevant applications 302.

Regarding the input module 410, generally, any information obtained by the module 410 can be obtained from the data storage device 104. Information generated, received or otherwise obtained at the input module 410 can be stored at the data storage device 104 until needed.

Input-module data is passed on to the activity module 420.

The pedestrian-communications sub-module 422 of the activity module 420, when executed by the hardware based processing unit, determines, based on the data received from the input module 410, communications to send to one or more nearby pedestrian communication devices 32.

In various embodiments, the pedestrian-communications sub-module 422 determines which pedestrian communication devices 32 are nearby based on data from the input module 410, or receives from the input module 410 data already indicating nearby pedestrian communication devices 32. In the latter case, the pedestrian communication devices 32 can be identified by the input module 410 (e.g., by the pedestrian-device inputs sub-module 412), or by another device such as a server 50 determining that the pedestrian communication devices 32 are nearby.

Determining that the pedestrian communication devices 32 are nearby can include, for instance, determining a relative proximity or separation between the vehicle 10 and subject pedestrian communication devices 32 being within a threshold separation or distance.

Or determining that the pedestrian communication devices 32 are nearby can include determining that the pedestrian devices 32 are within a threshold distance of the vehicle 10 or vehicle path, such as within a circular geo-fence, or vehicle-direction defined parabolic or hyperbolic geo-fence, or other shaped fence having a predetermined-size.

The pedestrian-communications sub-module 422 determines, based on input data from the input module, such as regarding any of vehicle position information, pedestrian-device position information, weather or road conditions, etc., a communication to send to one or more of the pedestrian communication devices 32.

The communications to the pedestrian communication device 32 can include any of a wide variety of types of information, instructions, signals, etc. Communications to the pedestrian communication device 32 can include, for instance, a notification configured to cause the device 32 to notify the pedestrian of a present or impending circumstance definitely, likely, or possibly involving the vehicle 10 and the pedestrian communication device 32.

As an example, while the first pedestrian $33_1$ may be preparing to cross an intersection, while a street-side 'walk' signal at the corner indicates they can safely walk across, the vehicle pedestrians-communications sub-module 422 may determine based on positions and movements of the vehicle 10 and of the first pedestrian communication device $32_1$, and on an icy road condition, that the vehicle 10 will surely or likely not be able to stop safely before the cross-walk area, and so further determine to send a notification to the first pedestrian communication device $32_1$ for notifying the first pedestrian $33_1$ to not enter the cross walk.

The notification can also include a reason that an action is being taken or recommended—e.g. "APPROACHING VEHICLE UNABLE TO STOP" OR "VEHICLE APPROACHING ON ICE" or " . . . ON SLICK ROAD SURFACE"). The application of the pedestrian communication device 32, or related profile or preference, is configured or set to, in some implementations providing a notification for user consumption, limit or not include an explanation in order to focus user attention on the notification, such as "DO NOT ENTER CROSSWALK!"

As another example communication, the vehicle communication to the pedestrian communication device 32 can indicate that the vehicle 10 is approaching the pedestrian 33. The communication in some implementations includes related dynamics information, such as the locations of the vehicle 10 and pedestrian device 32, or relative locations, positioning or spacing of the vehicle 10 and pedestrian device 32.

Communications regarding vehicle 10 location, or relative position, spacing, or movement are in some embodiments configured to allow the pedestrian communication device 32 to use data in the communication to show the position, spacing, etc. on a map at a display of the pedestrian communication device 32. Such communications can be sent directly to detected devices, and in some cases is broadcast for any pedestrian device to receive, directly or indirectly via local infrastructure, other mobile devices, or other vehicles, for instance.

In some implementations, some of the communications are provided by the vehicle 10 to the pedestrian communication device 32 to advise the pedestrian communication device 32, and not necessarily to notify the pedestrian 33, of present circumstances. The communication can advise of the dynamics information, such as the location or relative location of the vehicle 10 and/or pedestrian-vehicle separation distance, for instance, and not lead to the pedestrian communication device 32 notifying the pedestrian 33. The dynamics information may not indicate an impending emergency situation that the pedestrian 33 should be notified of, for example.

The vehicle-communications sub-module 424, determines, based on input from the input module 410, any communications to be communicated to an occupant of the vehicle 10. In the event of a driver-driven vehicle 10, the communication can advise the driver of the presence, location, and movement of one or more nearby pedestrian communication devices 32, and thereby of the one or more nearby pedestrians 33 using the devices 32.

Relative position and movement is in some embodiments shown on a map at the vehicle 10, for instance, at the visual display 37.

Notification to the driver of the vehicle 10 can include an alert advising expressly that the driver should alter driving, such as by slowing, accelerating, and/or turning the vehicle 10, based on input data from the input module 420. The alert, as with all communications described herein, can be made by way of any one or more communication types or modes, such as by text, tone, audible words, haptic output, lights or icons, the like, or other.

In a contemplated embodiment in which the vehicle has fully or partially autonomous driving features, the vehicle 10 may determine to takeover some or all control, from manual control, to avoid an incident involving the pedestrian 33. The takeover can be effected with communication to the driver via the vehicle-communication sub-module 424. The vehicle maneuver can be arranged via the vehicle-controls sub-module 426, described more below.

As another example vehicle communication, the vehicle-communication sub-module 424 in some embodiments provides a communication to passengers, of a vehicle being driven autonomously, advising that the vehicle is making or about to make a new maneuver, and perhaps an explanation therefor—e.g., because of a nearby pedestrian 33 and a slick road condition. Again, relative position and movement is in some embodiments shown on a map at the vehicle 10, for instance, at the visual display 37.

The vehicle-controls sub-module 426, executed by the processing unit 106, determines one or more automated vehicle maneuvers to take based on input data from the inputs module 410.

Continuing with prior examples, the vehicle sub-module 426 may determine, considering, for instance, vehicle dynamics (location, velocity, etc.), pedestrian-device dynamics, and road conditions, such as a snowy or otherwise slick road, that earlier or harsher (than previously planned) braking is necessary in order to ensure or better ensure that the vehicle 10 will not come near a pedestrian 33.

In various embodiments, planned vehicle and/or pedestrian(s) paths could be enhanced using vehicle and pedestrian presence information. In any embodiment, navigation information may be incorporated, such as in evaluating or planning a path based on vehicle and pedestrian(s) presence and location information. Relevant information in some embodiments includes past dynamic path for the vehicle or pedestrian(s). As an example, if the vehicle is being driven or autonomous driving toward a user home, and is about to turn left, and a pedestrian is shortly ahead on the left, the driver (human or autonomous) and/or the pedestrian would be notified. A pedestrian on the right of the vehicle need not to be notified, and the vehicle may not advise the driver of the pedestrian on the right because the risk of problem is very low. These aspects can be implemented accordingly via pedestrian mobile devices, such as via a standard or walking-mode of a navigation system they are using, whether the pedestrian walking, has been standing without moving for some time, etc.

The external-communications sub-module 428, when executed by the processing unit 106, provides communications to destination systems or apparatus external to the vehicle 10, other than the pedestrian devices 32 as the destinations. The other systems may include, for instance, roadside infrastructure, such as a smart-traffic light, roadside beacon, or remote server 50. A communication to a traffic light may instruct the light to change a pedestrian signal to "DON'T WALK", or keep it at "DON'T WALK" based on vehicle dynamics, pedestrian device dynamics, and road conditions.

Communications to external systems can also indicate anything about present conditions, such as vehicle dynamics and identity, dynamics and identity of nearby pedestrian communication devices 32, decisions made by the vehicle system 20, accordingly, and supporting reasons for the decisions.

In various embodiments, decisions are made together about vehicle and pedestrian path based on their presences and any other relevant information, such as other nearby pedestrians, traffic, obstacles for the vehicle or passengers, etc. The decisions can be made by one or both of the vehicle system and the pedestrian mobile device. In some embodiments, the vehicle and/or pedestrian device includes a negotiation sub-module. The negation sub-module can include or be a part of any of the sub-modules of the activity module 420, and is considered illustrated generally by the activity module in FIG. 4. The negotiation can be part of the vehicle-controls sub-module 426 and the pedestrian-communications sub-module 422, for instance—determining vehicle dynamics via the first 426, and how to instruct or agree with the pedestrian or pedestrian mobile device vis the latter 422. The operations can also include interaction between or more vehicle sub-modules, such as the vehicle-controls sub-module 426 communication and negotiating with an analogous, or algorithmic counterpart, pedestrian-controls sub-module of the pedestrian mobile device.

on top of the notification module. The negotiation sub-module in various embodiments includes one or more algorithms configured to make decisions about vehicle and/or pedestrian path. The vehicle and pedestrian device systems communicate with each other in real time to determine a best routing or movement for the vehicle and/or pedestrian under the circumstances. The interaction can be analogous to human-to-human, you-first or me-first scenario, wherein people agree mutually on dynamics of them by a spoken or unspoken negotiation. As an example implementation, rather than simply notifying or warning a pedestrian via the pedestrian device of an upcoming vehicle, the vehicle could send consecutive messages that it has detected the pedestrian and is therefore planning to change lanes, thereby advising the pedestrian that they need not, for instance, back up or change their course. Or in the same case, if a pedestrian profile in the pedestrian mobile device indicates that the pedestrian moves very slowly, such as due to age or handicap, the pedestrian device may reply with a message, before the vehicle changes lane, advising the vehicle that it need not change lane because there is not a risk of interaction—i.e., the vehicle will be long past by the time the pedestrian reaches the curb.

Systems-update sub-module 429 initiates update of the vehicle data storage unit 104. Update information can indicate, for instance, a user-profile preference update determined by the systems-update sub-module 429 or another module or sub-module based on user feedback, input or activity.

If in response to the vehicle 10 notifying the vehicle driver by two modes, haptic and audio, for instance, the driver may respond to the vehicle 10 indicating that audio alone is preferred, or that haptic is not preferred. The update, if permissible—the user cannot change a preference so that no alert is provided in emergency situations, for instance—is made in the appropriate storage 104 location, such as in an appropriate user profile.

In contemplated embodiments, some of the output of the activity module 420 is provided to the input module 410, for use in processing at input module 410. This feedback is indicated schematically by arrow 411.

Output of the activity module 420 is in various embodiments provided to sub-modules of the output module 430.

The sub-modules of the output module 430 format, convert, or otherwise process output of the activity module 420 as may be needed prior to delivering output or initiating an actuation, communication, or other action.

As shown, example system output components include vehicle speakers, screens, or other vehicle outputs 70.

Example system output components can also include vehicle occupant communication devices 32, such as smartphones, wearables, and headphones.

Example system output components can also include remote systems 50 such as remote servers and driver computer systems—for instance, home computer. The output can be received and processed at these systems, such as to update a driver profile with a determined preference, activity taken regarding the driver, the like, or other.

The occupant-notification sub-module 432 initiates provision of communications to the driver and/or passengers of the vehicle 10, as determined by the activity module 420, such as by the vehicle-communications sub-module 424 of the activity module 420.

The communications are provided via any output communication device of the vehicle output devices 70.

The pedestrian-communications sub-module 432 initiates provision of communications to pedestrian communication devices 32, whether for delivery to the corresponding pedestrian(s), as determined by the activity module 420, such as by the pedestrian-communications sub-module 422 of the activity module 420. The communications are delivered from the vehicle 10 by any vehicle communication device 30 and any suitable communication protocol—BLUETOOTH, DSRC, etc.

The vehicle control output sub-module 434 initiates vehicle functions. Example vehicle functions include and are limited to fully or partially autonomous driving functions, based on output from at least the vehicle-controls sub-module 426 of the activity module 420. Vehicle functions in various embodiments include maneuvers required to avoid or limit risk of coming near a nearby pedestrian 33, or blinking of high-beam lamps, as a few more examples.

In various embodiments, information obtained from the pedestrian mobile device is used in a vehicle navigation system, whether the use relates to the pedestrian. The information can be output by vehicle control output sub-module 434, for instance, and/or the vehicle-controls sub-module 426, as examples. The information can be used to enhance, or supplement, a machine-vision sub-system of the vehicle, for instance. As pedestrian-safety example, if an obscured pedestrian (not visible to the vehicle or driver) is detected by wireless communication with the pedestrian's mobile device, information from the pedestrian device or indicating pedestrian-device presence can be added as an input for processing at the vehicle navigation system, whether as if from the machine-vision sub-system. Similarly, if a vision-based vehicle sub-system is "unsure" of the presence of a pedestrian—has determined that there may be a pedestrian nearby, but not with high likelihood or heavily-corroborating sensor data, information from or about the pedestrian device can be used to corroborate whether the pedestrian is presence, where they are located, how they are moving or planning to move, etc.

The external-communications sub-module 436 initiates, based on output of the activity module 420—from at least the external-communications sub-module 428—sending of communications to devices, systems, or apparatus external to the vehicle 10 other than the pedestrian communication devices 32. The communications are delivered from the vehicle 10 by any vehicle communication device 30 and any suitable communication protocol—WI-FI, BLUETOOTH, cellular, satellite, etc.

In various embodiments, the external-communications sub-module 436 determines communications to provide to systems external to the vehicle 10, such as to other vehicles, a user computer, and a customer service center such as the OnStar® center, which can be configured to in turn take any of a variety of actions, such as notify vehicle occupants, users, or owners, vehicle fleet managers, the like, or other.

The output module 430 can also include a sub-module, which can be any of the output sub-modules shown, or another, configured to update the vehicle storage device 104 with data indicative of determinations or output of the output module 430, or to update vehicle user profiles or ancillary data 112. Output of the output module 430 can also be provided to the input module 410 and used in input module 410 processing described herein. The feedback referenced above in this paragraph is indicated schematically by arrow 431.

The process 500 can end or any one or more operations of the process can be performed again.

VII. Pedestrian-Device Algorithms and Operations

The pedestrian communication devices 32 comprise computing modules configured to perform any of the functions described herein for the pedestrian communication devices 32. The modules are in various embodiments part of a pedestrian-device application 302.

The pedestrian communication device modules and sub-modules thereof can be structured and have functions and names analogous to those described above with respect to the vehicle 10. The pedestrian communication device may include input, activity, and output modules, for instance.

As an example, modules and sub-modules in various embodiments may include any of:
Input Module
   a vehicle(s)-inputs sub-module;
   a pedestrian-device inputs sub-module;
   an external-inputs sub-module; and
   a pedestrian profile sub-module.
Activity Module
   a vehicle-communications sub-module;
   a pedestrian-communications sub-module;
   an external-communications sub-module; and
   a pedestrian-device update sub-module.
Output Module
   a pedestrian-notification sub-module;
   a pedestrian-device update sub-module; and
   an external communications sub-module, which can initiate communications with a remote server 50, other pedestrian devices, etc.

VIII. Additional Features and Example Implementations

The systems of the present technology, and methods performed thereby, in various embodiments, enables the vehicle to send and receive communications to/from pedestrian communication devices 34, and thereby in some case with pedestrians 33, located a present or impending area near the vehicle 10.

The vehicle system 20 and pedestrian devices 32 can include respective applications customized for the purposes described herein.

Example pedestrian devices 32 include pedestrian mobile phones, wearables, smart wheel-chairs, smart cane, the like, or other.

The technology in various embodiments includes systems and methods that enable a pedestrian 33 to determine and/or set pedestrian preferences, such as for a profile, from some smart device—e.g., wearable, mobile, etc.

The technology in various embodiments includes systems and methods that enable pedestrian smart devices 32 to produce an output based on the geographic location of the pedestrian holding or wearing the device 32. Output could also or instead be based on a wide variety of other parameters, such as pedestrian behavior or features (movement, velocity, acceleration, height, handicaps), or any of those described herein. Pedestrian device output can be used to update a pedestrian profile and/or communicated to the vehicle system 20.

The technology in various embodiments includes systems and methods that enable vehicle systems to react to pedestrian conditions or features automatically, such as by sensing something about the user condition or body directly. Resulting actions in various embodiments include determining pedestrian needs and/or editing a pedestrian preference—for instance, changing contextual settings for audible notifications, changing gap settings for adaptive cruise control, etc.

The technology in various embodiments includes systems and methods that enable vehicle systems 20 to notify pedestrians 33 about a state of the vehicle 10, such as by contextual sounds, speech, haptics, or visuals provided to the pedestrian via their mobile device 32.

The technology in various embodiments includes systems and methods that enable car systems to notify vehicle drivers and passengers about vehicle state and about state of pedestrians in vehicle surroundings.

The technology in various embodiments includes systems and methods that enable vehicle systems to notify other vehicles and their drivers & passengers about vehicle state, and about states of nearby pedestrians, such as by providing an alert in the vehicle to notify the driver or autonomous-driving system to not start a passing maneuver because of a pedestrian 32, having a detected mobile device 32, that could be affected by the maneuver.

The technology in various embodiments includes systems and methods to facilitate and manage communications between vehicles and pedestrians smart devices (for example: mobile apps, wearables), to control vehicle driving systems, such as autonomous driving functions, and to notify vehicle occupant(s) of nearby pedestrians, who may otherwise not have been noticed by the occupant(s).

The technology in various embodiments allows pedestrian to create or update their profiles via the customized application on their pedestrian communication device, or via another interface, such as a personal computer interface including the app or an online or browser version, analog, or interface.

Pedestrian characteristics can be static or dynamic:
static characteristics can include, a person being partially or fully blind visually (e.g., having limited visibility when it is darker outside), the person being a child or elderly, as just a few examples; and
dynamic characteristics can include the person being sick presently, carrying a very heavy load, or being in a hurry, as a few examples.

In various embodiments, a pedestrian device application 302, or other interface, allows the pedestrian to update their profile by any convenient manner, such as by selecting from menus, typing in a preference, communicate preferences by speech, which are translated to profile updates. An example communication from a pedestrian is, "I prefer to know that all nearby or approaching vehicles are aware of my presence before I cross a road."

As another example, the pedestrian 33 may communicate a preference such as, via the pedestrian device, asking the vehicle 10 (by text, menu selection voice, etc.) to advise nearby or approaching vehicles to flash their high-beam lights for one second to notify the pedestrian 33 that they see the pedestrian at night. In some cases, the vehicle 10 can be configured to act on this setting or preference automatically, without vehicle user intervention.

In various embodiments, the technology includes a smart vehicle V2P agent receiving inputs from all pedestrian communication devices in a radius of X meters of the vehicle 10, such as 50 meters.

In some cases, a smart vehicle V2P agent analyzes input data and determines any of various vehicle control or vehicle maneuvers to implement, such as:
controlling vehicle functions, directly, even before that the driver can react manually, such as by: braking stronger; adjust an adaptive-cruise-control (ACC) setting, such as ACC gap, turning on high beam lights, flashing beam lights, and stopping near the pedestrian.
controlling autonomous vehicle functions directly, in response to environmental features.
using the V2P communication channel as an effective additional vehicle sensor;
controlling external behavior of vehicles, such as electrical and/or autonomous automobiles;
informing driver and passengers of important information from pedestrian devices 32, or from pedestrians 33 via their devices 32;
providing pedestrian communications to the pedestrian 33 via the pedestrian device 32;
notifying or alerting pedestrians about context, state, or conditions, such as an approaching vehicle, a vehicle approaching at high speed or higher than usual or safe speed, bad weather or road condition, and/or recommending action by the pedestrian, such as a recommendation to "Please be cautious—(because) vehicle/driver likely cannot see you well," or, "a vehicle (vehicle 2) is passing me (communicating vehicle 1), and you might not see it (vehicle 2) yet," or "I (communicating vehicle 1) am passing another vehicle (vehicle 2) on a side of the vehicle opposite you and you might not see me (vehicle 1) yet," These quotes are provided for exemplary purposes, and the communication can take any of a wide variety of suitable forms, so long as the just is communicated, whether by icons, map artifacts, haptic output, audio, etc.
sending to one or more appropriate nearby pedestrian devices 32 a message from the vehicle 10, such as an autonomous vehicles/shared vehicle, that is approaching or nearby for a purpose of delivering a package to a pedestrian 33, picking up a package from the pedestrian 33, or to pick up or drop off a person.
notifying parents about their child crossing a road without them that the vehicle passing are recognizing the child appropriately, or apparently not, such as if vehicle are not slowing down or stopping as would be expected considering the child's presence
developing comfort and trust regarding operation of vehicles (whether autonomous) in people having disabilities by communicating to them that they are recognized by approaching or passing vehicles 10.

Programming factors or features in various embodiments include any of:
Profile_Create—allowing a user to create a user profile, or create or edit a preferences, at the pedestrian communication device or vehicle;
Plot 1—plot location of pedestrians determined present in a surrounding area for a vehicle, on a visual interface of the vehicle for the vehicle driver or other occupant(s).
Plot 2—plot of vehicle location at pedestrian device to inform the pedestrian of the vehicle presence, and possibly also about vehicle dynamics or relative dynamics between the vehicle and pedestrian device.
Cloud send—sending data to a cloud or other remote apparatus, from the pedestrian device or the vehicle 10, information such as vehicle id, date, time, location, dynamics, etc.
Customer interact—customer can interact with customized app, whether at pedestrian device (app 302 of device 32) or vehicle.
V2P comm features—vehicle provides notifications to pedestrian devices 32 including a choice of communication modality, protocol, types or amount of information to be shared, timing of communications or data sharing, etc.

V2O—vehicle provides communications to driver or other occupant, such as bout nearby pedestrians and resulting actions that the vehicle system 20 is taking or recommends. The actions can be determined based at least partially on input from one or more of the nearby pedestrians 33.

Vehicle control commands—vehicle 10 receives command from pedestrian device 32 advising of a manner that the vehicle should be operated, such as a manner of driving or a maneuver to make. As another example operation to change, the command may instruct the vehicle or driver to initiate high beams, flashing beams, light horn actuation, etc., under certain circumstances, such as for vehicles approaching an interaction in the dark.

Vehicle-Ack—the vehicle 10 notifies a pedestrian device 32 that a profile preference, pedestrian message, etc., from the pedestrian device 32 was received.

P-ACK—the pedestrian device 32 notifies vehicle 10 that vehicle's message or notification was received at the pedestrian device 32.

Vehicle-to-pedestrian (V2P) in various embodiments include features for interacting with pedestrians 33, their devices 32, and vehicle occupants 10, and/or the vehicle 32, in relatively higher-risk situations. One aim of V2P system and methods is to alert a pedestrian 33 of a vehicle 10 that might harm them, and to alert the vehicle 10 of presence the pedestrian 33. The notice to the pedestrian device 32 can indicate certain conditions, such as vehicle dynamics, that put the pedestrian in danger under the circumstances. Particularly vulnerable pedestrians or situations include, for example:

A child on a scooter or running;
a blind person;
a vehicle approaching from behind a curve or behind another vehicle;
a vehicle trying pass another vehicle or bike;

Vehicle-to-pedestrian (V2P) in various embodiments include features for interacting with pedestrians 33, their devices 32, and vehicle occupants 10, and/or the vehicle 32, in relatively lighter-risk situations. As provided, aims of V2P system and methods include alerting a pedestrian 33 of a vehicle 10 that might harm them, and to alert the vehicle 10 of presence the pedestrian 33.

The main aim of the V2P system and methods is to maintain a bi directional communication between the pedestrian and the vehicle systems. For example:
The vehicle alerts the pedestrian in order to avoid a hazard—flood, splash of water on road, etc.
Bus/taxi notification to pedestrians waiting for services, such as:
An elderly person who might not be attentive, and included in his profile they prefer to take bus line 27. When line 27 approaches his station, a notification is sent to his pedestrian communication device 32.
For gaming—a pedestrian might get an additional score in a computer game when his behavior in or near roads is cautious or when the pedestrian performed a pre-communicated mission in the game, such as performing a task to confirm, via their pedestrian communication device 32, that the pedestrian recognizes a particular vehicle on the road, such as by directing a device 32 camera to the vehicle or inputting information about the vehicle 10.

IX. Select Advantages

Many of the benefits and advantages of the present technology are described above. The present section restates some of those and references some others. The benefits described are not exhaustive of the benefits of the present technology.

Benefits include facilitating communications between vehicles 10 and nearby pedestrian communication devices 32 for promoting safety.

The system allows provision of notifications to the vehicle 10 and pedestrian devices 32, and users thereof, which is especially helpful in situations in which the pedestrians 32 and drivers (human or automated) may not notice the other.

Benefits of various embodiments include automatic and proactive communication between vehicles 10 and pedestrians 33.

Some aspects have benefits from enabling autonomous vehicle reaction in response to sensing, or obtaining data indicating, pedestrian state (e.g., handicapped) and needs—e.g., the vehicle 10 to slow to enable extra, or more-than-usual, time for the pedestrian 33 to cross an intersection.

Benefits of various embodiments include integrating vehicles 10 with an Internet-of-things eco-system, such as in the vehicles 10 communication with participating pedestrian communication devices 32, infrastructure (smart streetlights, etc.), remote servers 50, and the like by any or all of direct wireless communications, the Internet, and any other suitable network.

Benefits in some cases result from the technology providing a pedestrian-oriented service that increases pedestrian trust level and safety with respect to vehicles 10, roadways, and particularly vehicles passing or moving near the pedestrian or a crosswalk or intersection near the pedestrian 33.

X. Conclusion

Various embodiments of the present disclosure are disclosed herein.

The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A vehicle system, for implementation at a subject vehicle, comprising:
a non-transitory computer-readable storage device comprising:
an input module that, when executed by a hardware-based processing unit, obtains input data indicating presence of a pedestrian communication device proximate the subject vehicle, wherein the input module includes a subject-vehicle-inputs sub-module that, when executed by the hardware-based processing unit, obtains vehicle context portions of the input data, the vehicle context portions comprising first context data about the subject vehicle and second context data about an other proximate vehicle; and
an activity module that, when executed by the hardware-based processing unit:
determines, based on the input data, in a pedestrian-presence determination, that the pedestrian communication device is or will soon be in or near a potential path for the subject vehicle; and
determines, based on the pedestrian-presence determination, a subject-vehicle action to be implemented by the subject vehicle,
wherein the activity module comprises a pedestrian-communications sub-module that, when executed by the hardware-based processing unit, determines, based on the first context data and the second context data, a pedestrian notification for use at the pedestrian communication device to alert a pedestrian using the pedestrian communication device of context involving the subject vehicle and the other proximate vehicle.

2. The vehicle system of claim 1, wherein the input module comprises a pedestrian-device inputs sub-module that, when executed by the hardware-based processing unit, receives, from the pedestrian communication device, a pedestrian-device-to-vehicle instruction communication instructing the subject vehicle of a specified manner for the subject vehicle to operate or be operated with respect to the pedestrian holding or wearing the pedestrian communication device.

3. The vehicle system of claim 2, wherein the pedestrian-device-to-vehicle instruction communication instructs the subject vehicle to at least one of:
blink or illuminate subject-vehicle headlights;
actuate a subject-vehicle horn;
decelerate the subject vehicle; and
move the subject vehicle to change driving lanes.

4. The vehicle system of claim 1, wherein the non-transitory computer-readable storage device comprises an outputs module including a subject-vehicle-controls sub-module that, when executed by the hardware-based processing unit, initiates performance of the subject-vehicle-driving action by the subject-driving vehicle.

5. The vehicle system of claim 1, wherein the pedestrian-communications sub-module determines the pedestrian notification to alert the pedestrian about the other proximate vehicle in response to determining that, based on the first context data, the second context data, and pedestrian location, the pedestrian cannot or may not notice the other proximate vehicle.

6. The vehicle system of claim 5, wherein the pedestrian-communications sub-module determines the pedestrian notification to alert the pedestrian about the other proximate vehicle in response to determining that the pedestrian cannot or may not notice the other proximate vehicle because the other proximate vehicle is or will be positioned behind a physical impediment, including the subject vehicle or another physical obstacle, between the pedestrian and the subject vehicle, from a perspective of the pedestrian.

7. The vehicle system of claim 1, wherein:
the pedestrian-communications sub-module determines the pedestrian notification to alert the pedestrian about the other proximate vehicle in response to determining that, based on the first context data, the second context data, and pedestrian location, the pedestrian cannot or may not notice the subject vehicle; and
the pedestrian-communications sub-module determines the pedestrian notification to alert the pedestrian about the subject vehicle in response to determining that the pedestrian cannot or may not notice the subject vehicle because the subject vehicle is or will be positioned behind a physical impediment, including the other proximate vehicle or another physical obstacle, between the pedestrian and the subject vehicle, from a perspective of the pedestrian.

8. The vehicle system of claim 1, wherein:
the input module includes a subject-vehicle-inputs sub-module that, when executed by the hardware-based processing unit, obtains vehicle context portions of the input data;
the vehicle context portions comprise first context data about the subject vehicle and second context data about an other proximate vehicle and
the activity module comprises a subject-vehicle-occupant-communications sub-module that, when executed by the hardware-based processing unit, determines, based on the first context data and the second context data, a subject-vehicle-occupant notification to alert a subject-vehicle occupant of context involving the pedestrian communication device, the subject vehicle, and the other proximate vehicle.

9. The vehicle system of claim 8, wherein the subject-vehicle-occupant-communications sub-module determines the subject-vehicle-occupant notification to alert the subject-vehicle occupant that a nearby pedestrian cannot or may not notice the other proximate vehicle and/or the subject automated-driving vehicle because of a physical impediment, including the other proximate vehicle, the subject vehicle, or another physical obstacle, between the pedestrian and the other proximate vehicle and/or the subject vehicle, from a perspective of the pedestrian.

10. The vehicle system of claim 1, wherein:
the input data comprises vehicle-occupant profile information; and
the activity module, when executed by the hardware-based processing unit, determines the subject-vehicle action based on the subject-vehicle-occupant profile information.

11. The vehicle system of claim 1, wherein obtaining the input data indicating presence of the pedestrian communication device by the input module comprises the input module receiving output from the pedestrian communication device.

12. The vehicle system of claim 1, wherein the activity module comprises a pedestrian-communications sub-module that, when executed by the hardware-based processing unit, determines, based on the input data, a pedestrian notification for use at the pedestrian communication device to advise a pedestrian using the pedestrian communication device of a manner that the pedestrian should move.

13. A vehicle system, for implementation at a subject vehicle, comprising a non-transitory computer-readable storage device, the non-transitory computer-readable storage device comprising:
- an input module that, when executed by a hardware-based processing unit, obtains input data indicating presence of a pedestrian communication device proximate the subject vehicle, wherein the input module includes a subject-vehicle-inputs sub-module that, when executed by the hardware-based processing unit, obtains vehicle context portions of the input data, the vehicle context portions including first context data about the subject vehicle and second context data about an other proximate vehicle; and
- an activity module that, when executed by the hardware-based processing unit:
  - determines, based on the input data, in a pedestrian-presence determination, that the pedestrian communication device is or will soon be in or near a potential path for the subject vehicle; and
  - determines, based on the pedestrian-presence determination, a subject-vehicle action to be implemented by the subject vehicle,
- wherein, the activity module comprises a subject-vehicle-occupant-communications sub-module that, when executed by the hardware-based processing unit, determines, based on the first context data and the second context data, a subject-vehicle-occupant notification to alert a subject-vehicle occupant of context involving the pedestrian communication device, the subject vehicle, and the other proximate vehicle,
- wherein the subject-vehicle-occupant-communications sub-module determines the subject-vehicle-occupant notification to alert the subject-vehicle occupant that a nearby pedestrian cannot or may not notice the other proximate vehicle and/or the subject automated-driving vehicle because of a physical impediment, including the other proximate vehicle, the subject vehicle, or another physical obstacle, from a perspective of the pedestrian.

14. The vehicle system of claim 13, wherein the subject-vehicle occupant is a subject-vehicle driver.

15. A vehicle system, for implementation at a subject vehicle, comprising a non-transitory computer-readable storage device, the non-transitory computer-readable storage device comprising:
- an input module that, when executed by a hardware-based processing unit, obtains input data indicating presence of a pedestrian communication device proximate the subject vehicle, wherein the input module includes a subject-vehicle-inputs sub-module that, when executed by the hardware-based processing unit, obtains vehicle context portions of the input data, the vehicle context portions including first context data about the subject vehicle and second context data about an other proximate vehicle; and
- an activity module that, when executed by the hardware-based processing unit:
  - determines, based on the input data, in a pedestrian-presence determination, that the pedestrian communication device is or will soon be in or near a potential path for the subject vehicle; and
  - determines, based on the pedestrian-presence determination, a subject-vehicle action to be implemented by the subject vehicle,
- wherein, the activity module comprises a subject-vehicle communications sub-module that, when executed by the hardware-based processing unit, determines, based on the first context data and the second context data, a pedestrian notification to alert a pedestrian of context involving the pedestrian communication device, the subject vehicle, and the other proximate vehicle,
- wherein the subject-vehicle communications sub-module determines the pedestrian notification in response to determining that the pedestrian cannot or may not notice the other proximate vehicle and/or the subject automated-driving vehicle because of a physical impediment, including the other proximate vehicle, the subject vehicle, or another physical obstacle, from a perspective of the pedestrian, and
- wherein the pedestrian notification is configured to alert the pedestrian, via the pedestrian communication device, of the proximate vehicle and/or the subject automated-driving vehicle.

16. The vehicle system of claim 1, wherein the subject vehicle is an autonomous vehicle operating in an autonomous-driving mode.

17. The vehicle system of claim 13, wherein the subject vehicle is an autonomous vehicle operating in an autonomous-driving mode.

18. The vehicle system of claim 15, wherein the subject vehicle is an autonomous vehicle operating in an autonomous-driving mode.

* * * * *